United States Patent [19]

Hunt et al.

[11] 4,452,047

[45] Jun. 5, 1984

[54] RECIPROCATING SOLAR ENGINE

[76] Inventors: Arlon J. Hunt, 2025 Manzanita Dr., Oakland, Calif. 94611; Patricia G. Hull, 6600 Rolling Fork Dr., Nashville, Tenn. 37205

[21] Appl. No.: 403,717

[22] Filed: Jul. 30, 1982

[51] Int. Cl.³ .............................................. F03G 7/02
[52] U.S. Cl. .................................. 60/641.15; 60/509; 60/515; 60/649
[58] Field of Search ............. 60/641.8, 641.13, 641.14, 60/641.15, 649, 669, 673, 508, 509, 515

[56] References Cited

U.S. PATENT DOCUMENTS

| | | | |
|---|---|---|---|
| 3,256,686 | 6/1966 | Lindberg, Jr. | 60/516 |
| 4,055,948 | 11/1977 | Krause et al. | 60/641 |
| 4,089,174 | 5/1978 | Posnansky | 60/641 |
| 4,094,146 | 6/1978 | Schweitzer | 60/641 |
| 4,173,123 | 11/1979 | Gurtler | 60/641.13 |
| 4,313,304 | 2/1982 | Hunt | 60/641.8 |
| 4,353,212 | 10/1982 | Adler | 60/641.8 X |

FOREIGN PATENT DOCUMENTS 2461123  3/1981  France ......................... 60/641.14

OTHER PUBLICATIONS

Daniels–*Direct Use of the Sun's Energy*, Ballantine Books, 1974, pp. 188-193.

*Primary Examiner*—Allen M. Ostrager
*Assistant Examiner*—Stephen F. Husar
*Attorney, Agent, or Firm*—Fliesler, Dubb, Meyer & Lovejoy

[57] ABSTRACT

A reciprocating solar engine includes at least one cylinder 3 which has an essentially transparent head 4 and a piston 12 disposed in the cylinder 3. A gas-particle mixture 7, 8 is injected into the cylinder 3 between the piston 12 and the transparent head 4. Radiant solar flux is directed through the transparent head 4 so that the gas-particle mixture 7, 8 is heated and the piston 12 is pushed away from the transparent head 4. The engine further includes a device for allowing the radiant energy flux to be directed at the transparent head 4 during only a portion of the operating cycle of the engine.

8 Claims, 6 Drawing Figures

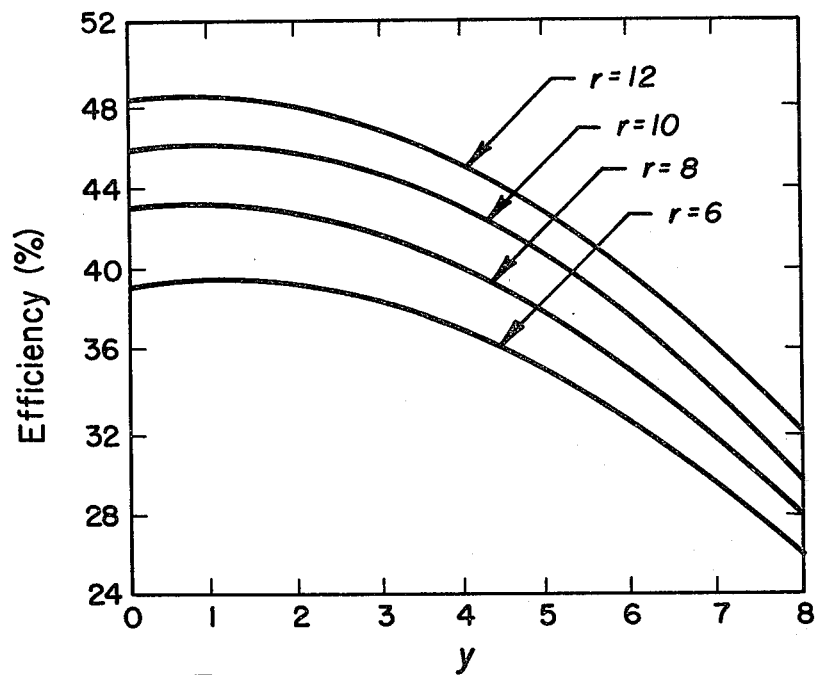
FIGURE 5
FIGURE 6
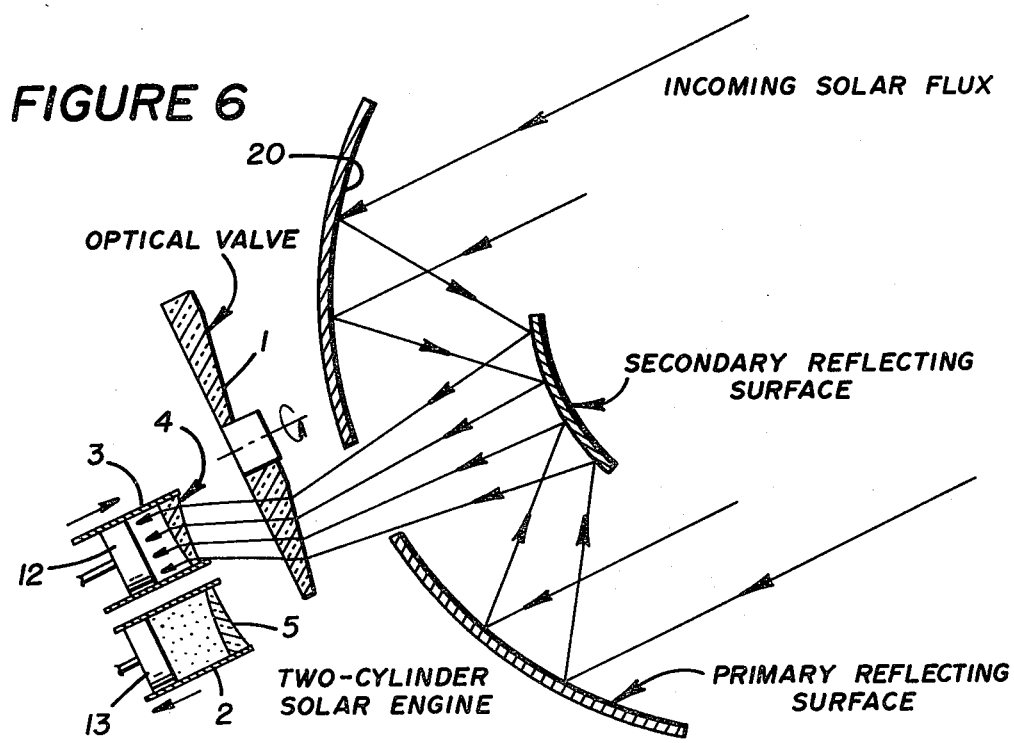

4,452,047

RECIPROCATING SOLAR ENGINE

TECHNICAL FIELD

This invention relates to devices that convert radiant energy to heat to produce mechanical power.

RELATED APPLICATIONS

Related to U.S. Pat. No. 4,313,304.

BACKGROUND ART

Prior art solar engines usually use an external heat exchanger or receiver to convert the sunlight to heat. Systems that heat fluids externally fail to utilize all the energy incident on the receiver because of losses in the heat collection, transport, and delivery systems. The transfer of energy in such systems is dependent on the mass flow of the working fluid, and is therefore limited by fluid flow through pipes, valves, and heat exchangers. Another consequence of externally heated systems is that radiant to thermal converters usually operate at significantly higher temperature than the working fluid, resulting in inncreased radiation losses and larger probability of failure due to thermal stresses and cycling. Engines that operate with externally produced heat that have been used with sunlight as the power source can include those using the Rankine, Brayton, and Stirling cycles.

The Stirling engine is a closed cycle, reciprocating engine that utilizes the energy in an externally heated working fluid. In solar powered Stirling engine designs, concentrated sunlight is usually directed onto a metal or ceramic a receiver that then transfers the heat by conduction to the working gas. The heated gas expands against a piston doing mechanical work. In addition to the working piston there is a transfer or displacer piston that moves the gas to and from the heating chamber. The expanded gas is passed through a recuperator to recover heat for the next charge. The use of concentrated sunlight to operate a Stirling cycle engine with a heat exchanger with a common surface radiantly heated and in contact with the working fluid was discussed by Daniels in his book "The Direct Use of the Sun's Energy" (Ballantine Books, 1974) and a working model was described in 1962 by Finkelstein in the 1961 meeting of the American Association of Mechanical Engineers (Paper 61-WA-297). These engines use a transparent window to allow the sunlight to enter the cylinder continuously.

There are several complicating factors that must be overcome to achieve a viable solar Stirling engine. These include: (1) the heat exchanger to transfer the solar energy to the gas, (2) the relative motion of the displacer piston and the working piston, (in free piston designs), (3) the sealing of the gas charge, and (4) the recuperation of heat from the expanded gas to supply it to the next charge, and (5) an external cooling system to remove the waste heat from the sealed gas charge.

A better means of introducing the heat to the engine is to use the radiant energy to heat the working fluid directly within the engine, thus eliminating problems encountered with conventional radiant heat exchangers. U.S. Pat. No. 4,313,304 discloses a radiant energy collection and conversion apparatus and method that utilizes a suspension of particles to directly absorb the concentrated sunlight and heat a working fluid and vaporize the particles after they have provided the heat exchange.

In another prior device that is disclosed in U.S. Pat. No. 4,089,174 issued on May 16, 1978 to Mario Posnansky, a cycle heat engine includes a window permeable to sunrays and a rotary expansion chamber containing a heat transfer medium. There are several problems with such a system; the closed cycle operation requires heat exchangers to remove the waste heat, a heat absorbing fluid with good solar absorption characteristics without degradation in the closed must be found, and the motion of the sliding seals against the window can cause damage to the windows thereby shortening engine life.

Accordingly an object of this invention is to provide a method and apparatus for converting the radient energy from the sun or other source to mechanical energy by using a reciprocating heat engine of open cycle design wherein the radiant energy is absorbed directly in the working fluid to provide higher effeciencies, lower average temperatures, using a simpler and more reliable mechanical design than hitherto available. A further object of this invention is to provide a method and apparatus to change the radiant energy from cylinder to cylinder by use of an optical valve assembly that introduces the radiant energy to the proper cylinder at the point in the thermodynamic cycle to provide the maximum possible conversion efficiency. Another object of this invention is to provide a means to absorb the radiant energy in the working fluid within the engine by a suspension of small, absorbing particles that may vaporize after fulfilling their absorption function leaving the exhaust of the engine substantially without particulate content. Further objects and advantages of our invention will become apparent from a consideration of the drawings and ensuing description thereof.

BRIEF DESCRIPTION OF THE DRAWINGS

FIG. 5 is a diagram illustrating typical efficiencies for a two cylinder reciprocating radiant engine for various compression ratios.

FIG. 6 is a schematic drawing of one embodiment of the reciprocating radiant engine and solar collection apparatus.

DESCRIPTION OF THE PREFERRED EMBODIMENT

A simple, reciprocating solar engine (SOLGIN) that uses direct absorption of sunlight to produce mechanical work is described here as an alternative to the solar powered engines mentioned above. The engine uses a suspension of ultrafine carbon particles within the cylinder to absorb concentrated solar radiation and heat the gas. The cycle begins when an air-particle mixture is drawn into the cylinder and compressed. At some point during the compression stroke an optical valve directs concentrated sunlight through a transparent cylinder head into the gas particle mixture. The particles absorb the sunlight, and heat the gas. In the expansion stroke, the heated gas drives the piston and oxidizes the particles. The use of optical valving and an open cycle design leads to a new thermodynamic cycle that the inventors have been unable to find described elsewhere.

Figure 1:
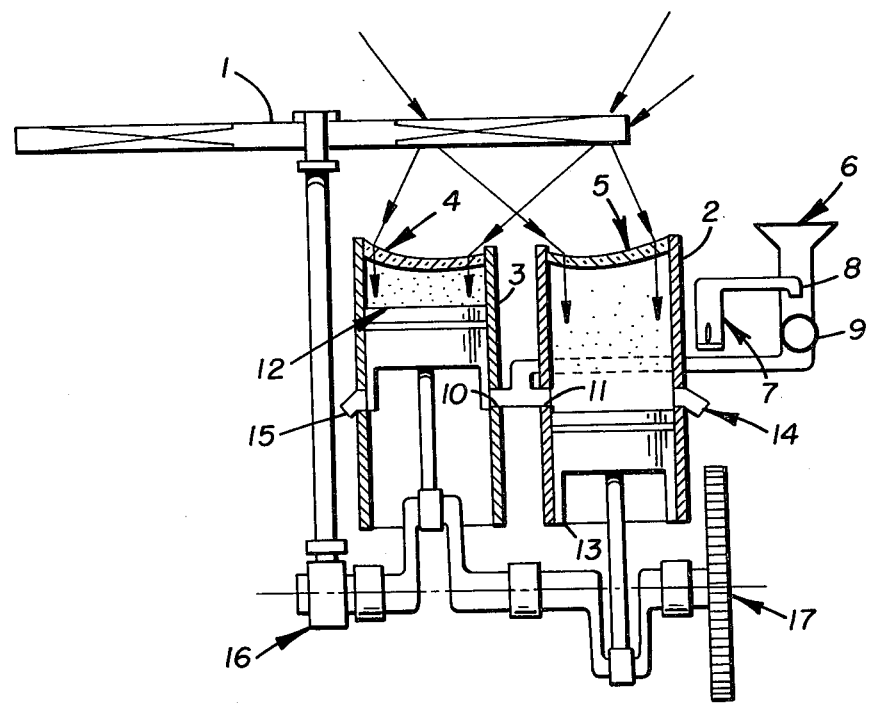
FIG. 1 is a sectional view taken in elevation of the reciprocating solar engine.
Figure 3:
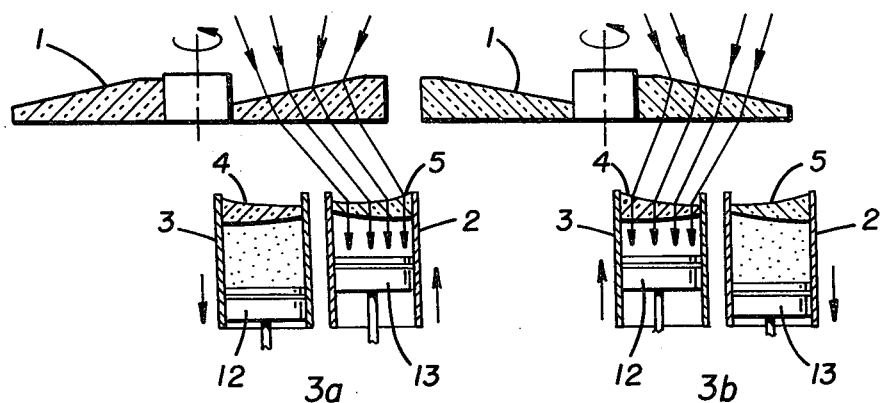
FIG. 3 is a schematic illustrating the action of the optical valve assembly in two different positions.

A sectional view of a two cylinder reciprocating radiant engine is shown in FIGS. 1, 3, 6. Radiant energy arrives to the optical valve 1 that directs the radiant energy to the cylinder 2, or the cylinder 3. The deflected radiation passes through a substantially transparent windows 4 and 5. Windows 4 and 5 may be shaped as lenses or optical elements to provide a more uniform illumination of the volume inside the cylinders 2 and 3. Air or other gas is admitted to the engine by the air intake 6 and absorbing particles that are produced by the particle generator 7 are mixed with the incoming gas stream by the injector 8. The gas-particle mixture may be partly pressured by a compressor 9 to facilitate its injection to the cylinders through ports 10 and 11. Either piston 12 or 13 moves upward after receiving a fresh charge and the gas-particle mixture is compressed with no illumination until the optical valve directs the radiant energy toward that cylinder. After the optical valve is "opened", the piston continues to compress the gas as it is being heated. After reaching top-dead-center the heated gas expands against the piston, converting the heat energy to mechanical motion and exhausting through ports 14 or 15. Gear assembly 16 synchronizes the motion of the optical valve with that of the engine. A flywheel 17 is used to help provide a constant speed for the engine. At a point in the cycle determined by the time and temperature history of the particles, the particles may oxidize or vaporize, leaving a particle free exhaust gas.

Each cylinder is equipped with a transparent window that allows radiant flux to enter. The window may be manufactured from one of several types of high silica glasses, and made appropriately thick to withstand the internal pressure. The "window" may be shaped like a lens to provide a more uniformly illuminated space inside the cylinder. The shape is convex inward to insure that it is in compression from the internal pressure in the chamber.

The light from the solar concentrator is directed to the appropriate cylinder by the use of an optical "valve". There are many possible designs for this "valve". One particular design illustrated in FIG. 2 utilizes a rotating element composed of conically shaped refractive elements. The design has the advantage of low losses (the surface can be treated or coated to significantly reduce the reflectivity) and the two light paths are symmetrical. FIGS. 3a and 3b illustrate the light path for two different positions of the valve. Note that light is always being directed at one or the other piston, never anywhere else.

FIG. 6 additionally shows a solar collection apparatus 20 used to collect solar flux for the radiant engine.

Figure 2:
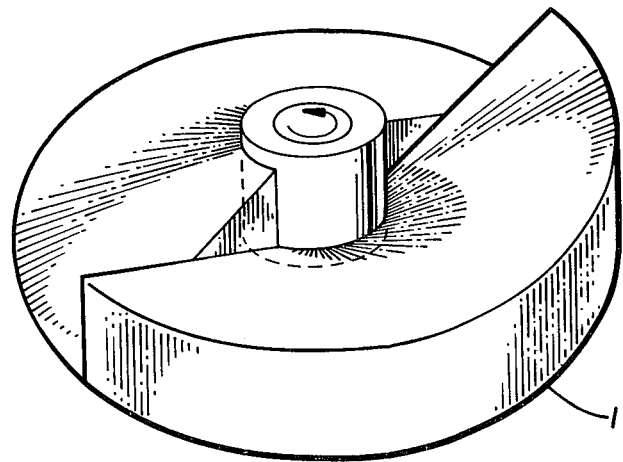
FIG. 2 is a perspective view of one embodiment of the refractive optical valve assembly used in the reciprocating radiant engine.

Other optical valves may be designed using elements with the same shape as the top of the valve illustrated in FIG. 2, but with reflective upper surfaces. In this case the light is reflected into the engine. The design can be expanded to four or more cylinders with additional light valves or by utilizing a different optical arrangement.

An important aspect distinguishing the SOLGIN from other solar powered engines is its use of small particles as a heat exchanger. Small particles are suspended in a gas and are irradiated with solar energy. The particles absorb the solar energy and because of their very large surface area and small size, they quickly release this energy as heat to the surrounding gas. In order to maximize the effectiveness of the small particles as solar receivers, the optical properties of the particles must be such that they have a high absorbance in the solar spectrum. The particles should be extremely small, less than 0.1 micrometer in diameter. In particles this size the entire volume of the particle acts as the absorber. Because it is an open cycle, particles must be generated continuously during the cycle. Therefore, an effecient and convenient method for producing particles must be available. Furthermore, the particles and their oxides should be environmentally benign since they will be exhausted at the end of each cycle.

Carbon appears to be the ideal compositon for the particles. Methods are available for producing the extremely small carbon particles; the optical properties of carbon are excellent for this application; and a number of forms of carbon exist which have different oxidation rates as a function of the temperature so that if the correct form of carbon is selected, the particles will oxidize during the heating process and be exhausted as carbon dioxide gas.

Of particular interest are (1) the mass of carbon particles necessary to produce a given absorption as a function of particle size, and (2) the optical efficiency of the particles as solar collectors. The mass loading per unit surface area necessary to produce an extinction of $1/e^2$ on the way from the front to the back of the chamber is only 14 micrograms per square centimeter. This mass of particles is very small compared to the mass of a combustion fuel to run the engine without sunlight (for the same power output). For particles less than 0.05 micrometers in diameter the collection efficiency can exceed 90% without the use of a cavity.

OPERATION OF THE INVENTION

A complete cycle of the solar engine consists of four parts. (1) Near the bottom of the upward stroke of the piston, with no incoming solar flux, ambient air that has been injected with a small mass of fine particles enters the cylinder and is compressed. (2) At some point in the compression stroke the optical valve directs sunlight into the air-particle mixture. The small particles absorb the radiation and quickly release the heat to the surrounding gas. During the expansion stroke the particles begin to oxidize, turning into $CO_2$. (3) At some point during the expansion stroke, the solar flux is diverted to the other cylinder and the heated air expands adiabatically against the piston producing mechanical work. (4) Near the bottom of the downward stroke of the piston the air-oxide mixture is exhausted, completing the cycle. The complete utilization of the solar resource requires the use of two or more cylinders. More than two cylinders may also be employed, with each utilizing solar radiation for an appropriate fraction of the total cycle time.

Figure 4:
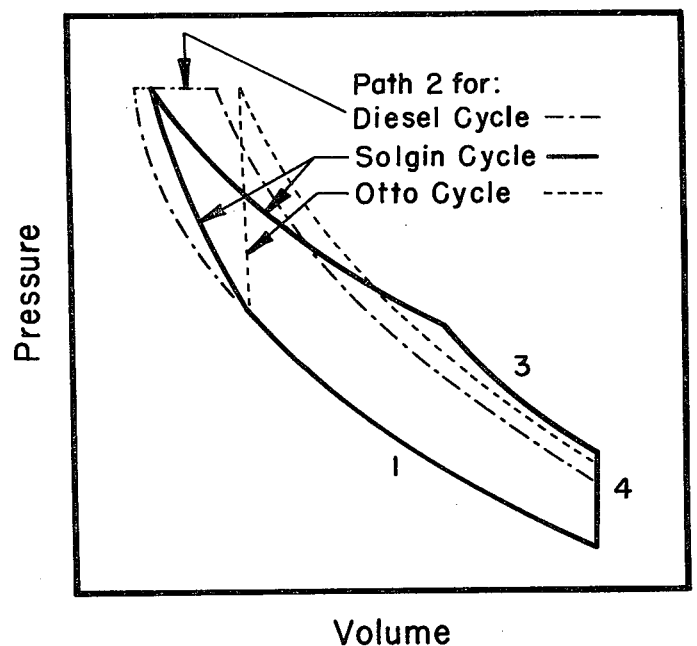
FIG. 4 is a pressure volume diagram illustrating the thermodynamic cycle of the reciprocating radiant engine and two comparative cycles.

The piston moves in simple harmonic motion throughout the cycle, and heat is added at a constant rate during that time. The phase of the cycle at which the valve is opened will be considered in the next section. This method of adding heat produces a not-so-familiar thermodynamic cycle indicated by the solid line in FIG. 4. The figure is not drawn to scale since the shape of the two segments of path 2 depends on the rate at which heat is added to the gas, and the rate of change of the volume during the time heat is added. In order to compare this thermodynamic cycle with more familiar cycles, consider two other ways in which heat may be added: (1) the gas is heated during such a short time when the piston is near top dead center such that the volume may be considered constant, (2) the piston is allowed to move as heat is added, keeping the gas at constant pressure. These two methods produce the familiar "Otto" and "Diesel" cycles generally associated with internal combustion engines. These two cycles are illustrated with dotted lines in FIG. 4.

The thermal efficiency of the engine is defined as the ratio of the net mechanical work done by th engine to the heat supplied by radiant flux to the engine during one cycle. The work done by the engine is given by the area enclosed by the paths shown on a pressure-volume graph in FIG. 4 and depends upon the point in the compression stroke at which the addition of heat is begun. The efficiency of the engine may be calculated for different periods and phases of heat injection. The thermodynamic question can be phrased as follows: given a constant rate of heat input for a fraction of the cycle equal to the inverse of the number of cylinders, what is the optimum timing for the heat injection and what is the corresponding efficiency? For a two-cylinder engine, the addition of heat may begin at any volume in the compression stroke. FIG. 5 illustrates the efficiency a two cylinder engine as a function of the time in the cycle that the radiant flux is turned on. FIG. 5 also illustrates the effect of the compression ratio r on the efficiency of the engine.

What is claimed is:

1. A method for producing power from radiant energy including the steps of:
   disbursing radiant energy absorbing particles in a gas stream;
   exposing the gas stream and radiant energy absorbing particles to intermittent radiant flux to heat said particles and gas for a portion of the operating cycle;
   allowing the heated gas to expand against a reciprocating piston to produce mechanical power.

2. The method of claim 1 including the step of vaporizing the particles after they have absorbed substantially all the radiation incident upon them.

3. Reciprocating radiantly heated engine comprising:
   at least one cylinder with one end closed by a substantially transparent head;
   a piston in said chamber;
   means of injecting a gas-particle mixture into said cylinder into the volume between said piston and said transparent head;
   means of directing radiant solar flux through said transparent head whereby said gas-particle mixture is heated and said piston is pushed away from said transparent head;
   means of controlling the radiant energy flux so that it enters said cylinder for only a portion of an operating cycle.

4. The apparatus in claim 3 including the step of using solar flux as the radiant source.

5. The apparatus in claim 3 including a shaped transparent window to redistribute the radiant flux incident upon said window.

6. The apparatus in claim 3 wherein more than one said transparent element is used to redirect the radiant flux to any number of heat receiving portions of a heat engine.

7. An optical valve assembly for controlling radiant flux in a heat engine comprising:
   a substantially transparent element shaped so as to redirect radiant flux incident upon it towards one heat receiving portion of a heat engine;
   means of moving said element so as to cause another portion of the element to intercept the radiant flux and direct it towards another heat receiving portion of a heat engine;
   means of synchronizing the motion of the said element with the operation of the heat engine.

8. Reciprocating radiantly heated engine comprising:
   at least first and second cylinders with one end of each cylinder closed by substantially transparent heads;
   a piston in each said chamber;
   means of injecting a gas-particle mixture into each said cylinder into the volume between each said piston and each said transparent head;
   means of directing radiant solar flux through each said transparent head whereby said gas-particle mixture is heated and said piston is pushed away from said transparent head, said means including an optical valve assembly having a substantially transparent element shaped so as to direct radiant flux incident upon it towards one of said transparent heads;
   means of moving said element so as to direct the radiant flux towards the other transparent head;
   means of synchronizing the motion of the said element with the operation of the pistons of the heat engine.

* * * * *

UNITED STATES PATENT AND TRADEMARK OFFICE
CERTIFICATE OF CORRECTION

PATENT NO. : 4,452,047
DATED : June 5, 1984
INVENTOR(S) : Arlon J. Hunt & Patricia G. Hull It is certified that error appears in the above-identified patent and that said Letters Patent is hereby corrected as shown below:

Column 2, line 5, before "cycle" insert "closed".

Signed and Sealed this

Sixth Day of November 1984

[SEAL]

Attest:

GERALD J. MOSSINGHOFF

Attesting Officer  Commissioner of Patents and Trademarks